June 12, 1956 A. L. HART 2,750,199
FRONT WHEEL MOUNTING FOR TRACTORS
Filed July 8, 1953 5 Sheets-Sheet 1

INVENTOR.
ANGUS L. HART
BY Paul, Moore + Duggan
ATTORNEYS

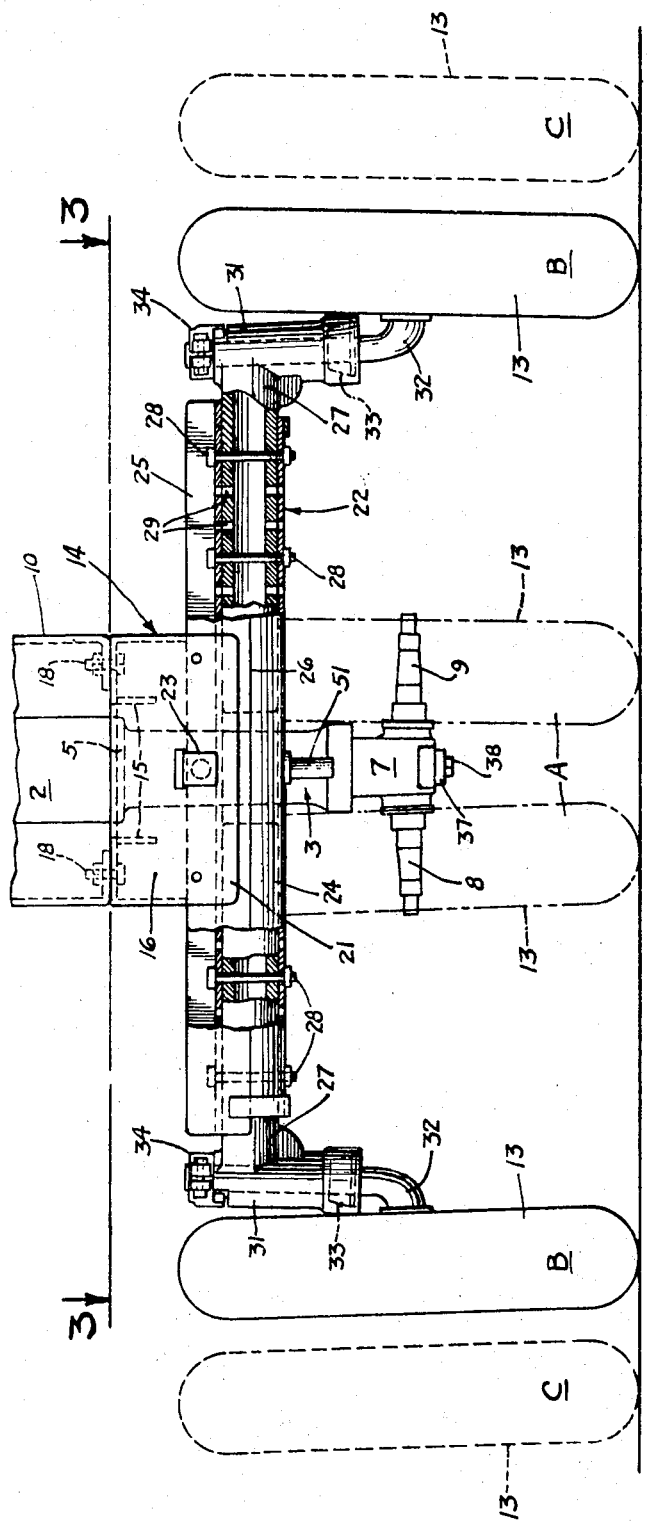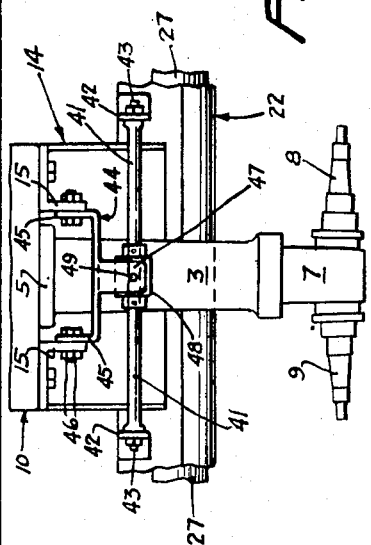

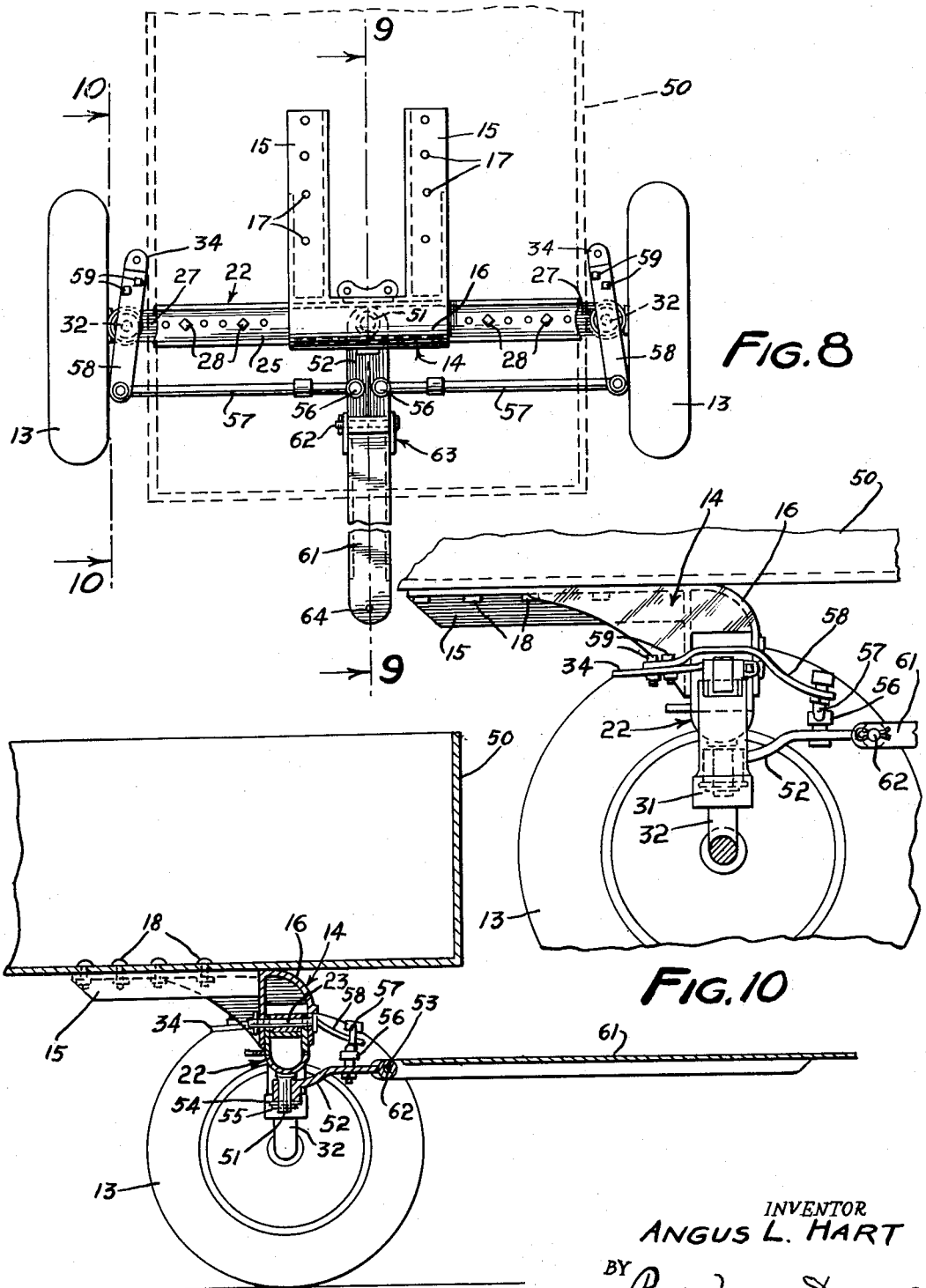

June 12, 1956 A. L. HART 2,750,199
FRONT WHEEL MOUNTING FOR TRACTORS
Filed July 8, 1953 5 Sheets-Sheet 4

INVENTOR
ANGUS L. HART
BY
ATTORNEYS

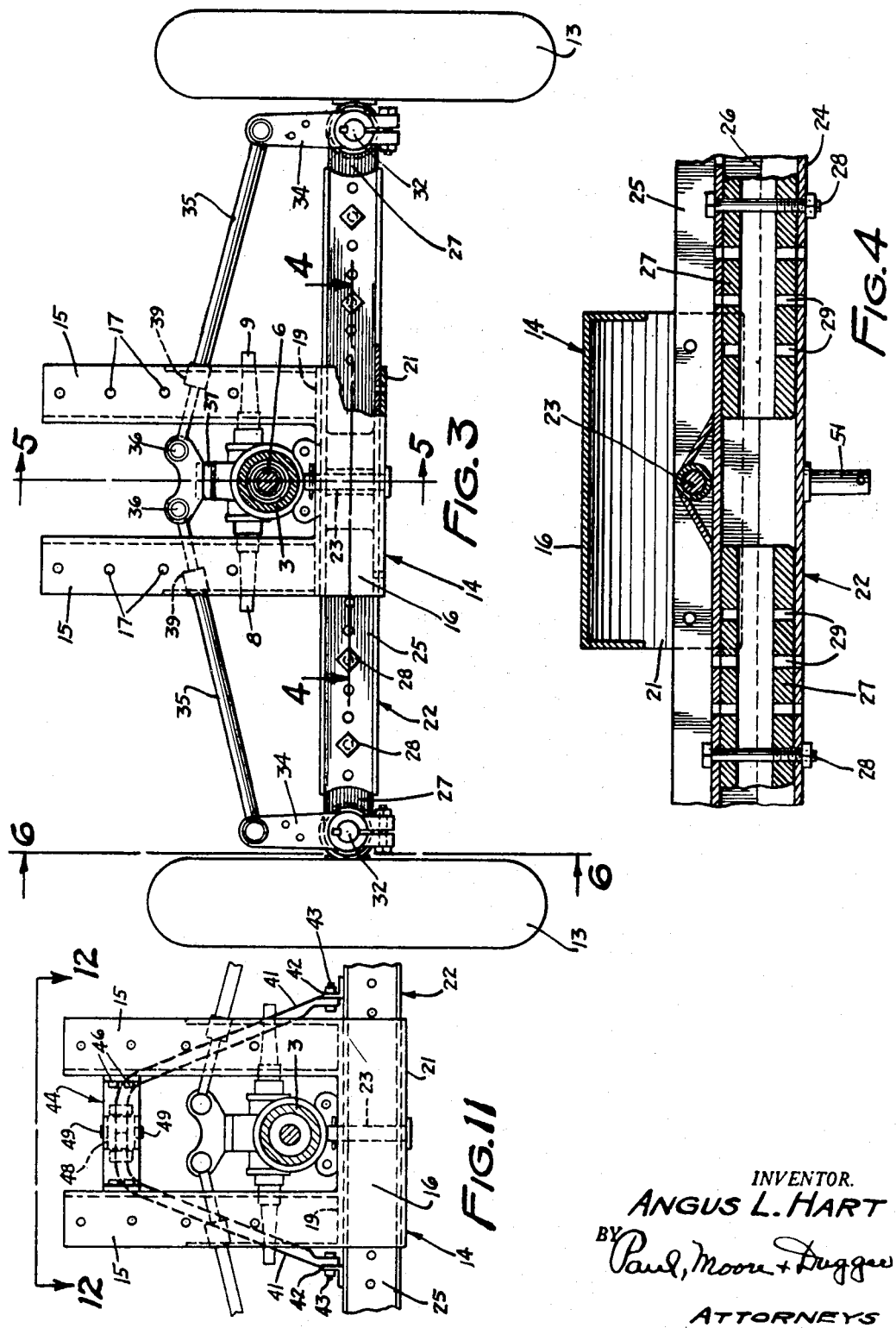

United States Patent Office 2,750,199
Patented June 12, 1956

2,750,199

FRONT WHEEL MOUNTING FOR TRACTORS

Angus L. Hart, Grafton, N. Dak.

Application July 8, 1953, Serial No. 374,433

4 Claims. (Cl. 280—93)

This invention relates to an improved front wheel mounting for tractors and more particularly to farm tractors having narrow gauge front wheels, and wherein the front wheels are mounted on the lower end of a pedestal secured to and suspended from the tractor frame, the closely spaced front wheels being adapted to travel between adjacent crop rows, when cultivating certain crops, said invention making it possible to readily convert such narrow gauge front wheel mountings to a wide or standard gauge front wheel mounting, whereby a tractor equipped with the present invention may be used for cultivating a wide variety of farm crops, and also whereby the tractor is rendered unlikely to "jack-knife" and turn over, when turning sharp corners while traveling in sand or soft soil, now a common hazard when operating most narrow gauge front wheel tractors.

Another disadvantage often experienced in the operation of a narrow gauge front wheel tractor is that when traveling in soft clay or soil, the narrow space provided between the lower portions of the inwardly canted front wheels tends to become filled with clay or soil which may render the tractor more difficult to guide in its traveling movements. It will thus be understood that with the exception of some cultivating operations, a wide gauge front wheel tractor is generally to be preferred over a narrow gauge front wheel tractor.

An important object of the present invention therefore is to provide a simple inexpensive front wheel mounting for tractors, whereby the axial spacing between the front wheels of the tractor may readily and quickly be varied by the operator to adapt the tractor for the particular job at hand.

Other and more specific objects of the invention resides in the telescoping arrangement of the front axle members which permit free axial adjustment of the telescoping axle members to vary the gauge of the front wheels; in the unique construction of the mounting bracket for the front axle members, whereby the usual pedestal for supporting the narrow gauge front wheel on the tractor frame may be left intact; in the construction of the steering mechanism whereby the usual upright shaft provided within the pedestal of the tractor may be utilized for transmitting steering or turning movement to the front wheels of the tractor; in the provision of a front axle structure which is extremely rugged in construction, and which is so designed that the stub axles supporting the front wheels may readily be axially adjusted in the field by the operator, should it become necessary to vary the axial spacing between the tractor's front wheels; and in the provision of such an apparatus which is so constructed that it may readily be detached from the tractor as a unit for the purpose of restoring the tractor to its original narrow gauge front, should that be found desirable for some reason; and in provision of a front axle assembly wherein the front wheels are adjustably supported in widely spaced relation to each other, and which is so arranged that it may be utilized as a front wheel assembly for a trailer, said assembly being provided with a draft tongue for coupling it to a power vehicle, and said draft tongue having connections with the front wheel spindles to impart turning movement to the front wheels, when the tongue is laterally oscillated.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings.

Figure 1 is a side elevational view of the conventional tractor showing the invention embodied therein and partially broken away to more clearly illustrate the construction thereof;

Figure 2 is an enlarged front elevational view of my novel front axle and its mounting bracket, the axle being partially broken away to clarify the telescopic arrangement of its complemental members, the dotted lines at the center of the figure showing the front wheels in their conventional narrow gauge positions, the full lines illustrating the standard gauge positions of the wheels, and the dotted line positions shown at the ends of the figure indicating the outermost positions of the tractor front wheels;

Figure 3 is a plan view substantially on the line 3—3 of Figure 2 showing the tie rods for transmitting turning movement from the steering shaft within the tractor pedestal to the front wheels;

Figure 4 is a detailed sectional view on the line 4—4 of Figure 3;

Figure 8 is a plan view of an axle assembly adapted for mounting on the front end of a trailer body and having a draft tongue for coupling the trailer to a power vehicle;

Figure 9 is a vertical sectional view on the line 9—9 of Figure 8;

Figure 10 is a vertical sectional view on the line 10—10 of Figure 8, on a slightly enlarged scale, showing in greater details the connection between the front axle and the draft tongue;

Figure 11 is a fragmentary top view of a front wheel axle mounting embodying a pair of radius rods; and Figure 12 is a fragmentary view substantially on the line 12—12 of Figure 11.

Figure 1:
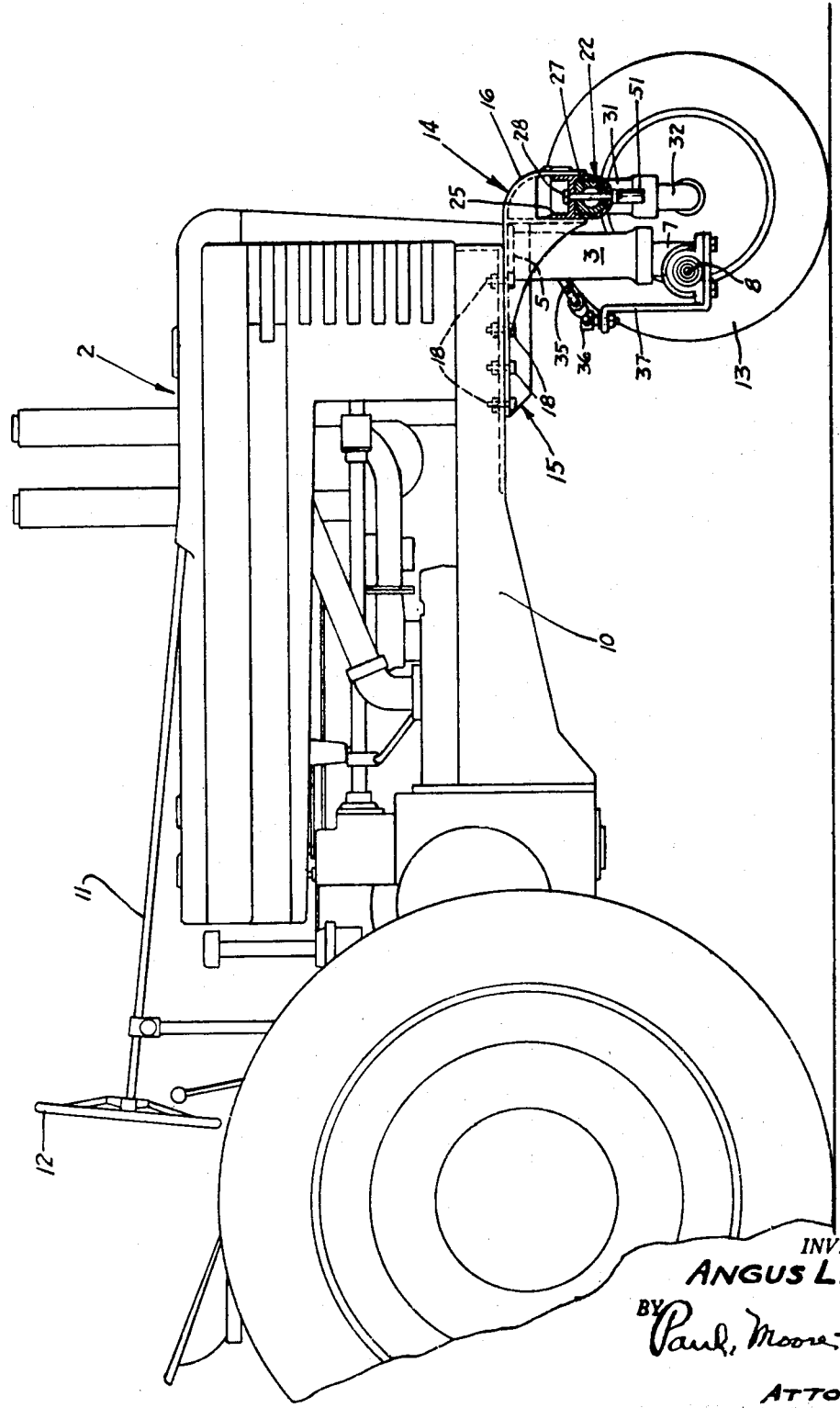
Figures 5, 6:
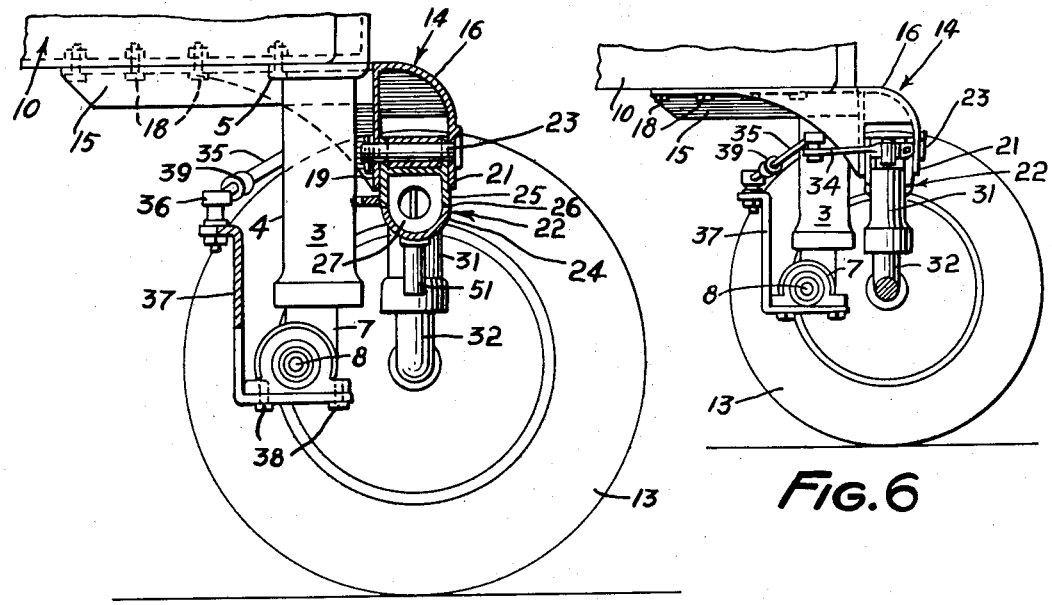
Figure 5 is a vertical sectional view on the line 5—5 of Figure 3.
Figure 6 is a vertical sectional view on a reduced scale, on the line 6—6 of Figure 3.

In the selected embodiment of the invention herein disclosed there is illustrated in Figure 1, a tractor, generally designated by the numeral 2, comprising a main supporting frame 10 to the forward end of which the usual front wheel supporting pedestal 3 is secured. The pedestal 3 as best illustrated in Figures 3 and 5, comprises a housing 4 provided at its upper end with an attaching flange 5 whereby it may be secured to the forward end of the tractor frame by suitable means such as bolts, not shown in the drawings.

An upright shaft 6 is rotatably supported within the pedestal 3 and is provided at its lower end with a head 7, to which the front wheel spindles 8 and 9 are secured in the usual manner. The upper end of the shaft 6 is connected to the usual shaft 11 of the steering wheel 12 of the tractor by a suitable gear mechanism, not shown in the drawings, and whereby the shaft 6 may be rotated to relatively swing the front wheels to guide the tractor in its traveling movement, by manipulation of the steering wheel 12. By reference to Figure 2 it will be noted that the front wheel spindles 8 and 9 are closely spaced relatively to one another so that the front wheels 13, when mounted thereon are closely spaced together, as indicated by the dotted lines in Figure 2.

A feature of the present invention resides in the provision of a novel front wheel mounting for a conventional narrow gauge front wheel tractor, whereby the front wheels thereof may readily be outwardly adjusted to a standard gauge, or to any other desired spacing required for a given job. The means for thus varying the spacing between the front wheels of the tractor is shown comprising a main supporting bracket, generally designated by the numeral 14, comprising spaced parallel arm members 15—15, connected at their forward ends by a connecting portion 16, thereby to provide a bracket which is substantially U-shaped in configuration. The spaced arms 15—15 are provided with suitable apertures 17 for receiving bolts 18 for securing the bracket 14 to the front end of the supporting frame 3 of the tractor.

Another feature of the invention resides in the unique formation of the bracket 14, whereby the usual pedestal 3 of the tractor may remain on the tractor when it is desired to replace the narrow gauge front wheels with a wide front wheel structure, as illustrated in Figure 2, and whereby the usual steering mechanism of the tractor may be utilized for relatively swinging the front wheels to guide the tractor in its turning movements.

Figure 7:
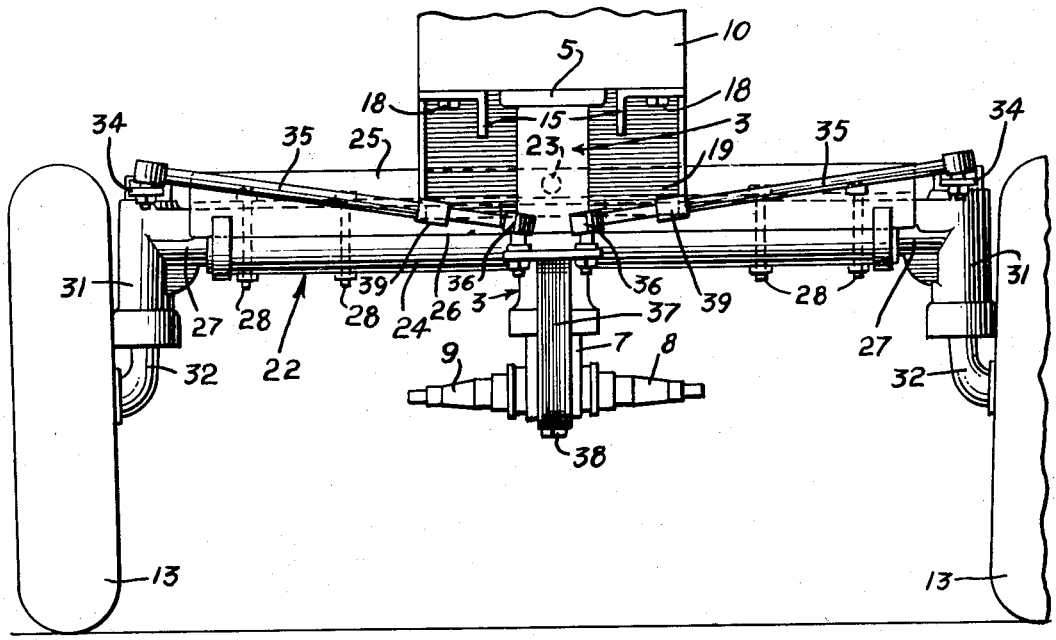
Figure 7 is a rear elevational view of the front axle shown in Figure 2.

The connecting portion 16 of the mounting bracket 14 is also U-shaped in construction, as shown on Figures 1, 2, and 5, and comprises downwardly directed spaced wall portions 19 and 21 adapted to receive a semi-tubular axle member 22 therebetween. A pivot bolt 23 pivotally secures the axle member 22 to the spaced walls 19 and 21 of the bracket 14, whereby the axle member may oscillate in a transverse plane, as will be understood by reference to Figures 2 and 7.

The front axle member 22, as here shown, comprises a lower semi-cylindrical member 24 having its upper edges welded to the lower edges of a horizontally disposed H-beam 25, as indicated at 26 in Figure 5, whereby the H-beam 25 and said semi-cylindrical member 24 become, in effect, an integral structure having great strength whereby it is not likely to deflect or sag under the weight of the tractor body, when the tractor is operating under a heavy load. By securing together the semi-cylindrical member 24 and the H-beam 25, as above described, a hollow or tubular front axle structure is provided, as clearly illustrated in the application drawings.

Telescopically received in the opposed end portions of the tubular front axle member 22, are a pair of stub shafts 27—27, which are secured in adjusted positions therein by a plurality of bolts 28, adapted to be received in spaced apertures provided in the top and bottom walls of the axle member 22. Each stub shaft 27 is shown provided with a series of axially spaced apertures 29 which cooperate to provide means for axially adjusting the spacing between the front wheels, which will readily be understood by reference to Figures 3 and 4.

The stub shafts 27 are shaped cross-sectionally to substantially fit the bore in the tubular axle member 22, as best illustrated in Figure 1, whereby the stub shafts cannot relatively rotate within said tubular axle member. The outer ends of the stub shafts 27 are provided with upright bearing sleeves 31 adapted to receive the front wheel spindles 32, which are rotatably supported in the bearing sleeves 31 by anti-friction bearings 33, indicated in dotted lines in Figure 2. The usual spindle arms 34 are secured to the upper ends of the spindles 32, as shown in Figure 3, and have tie rods 35 connecting thereto a pair of studs 36 shown secured to the upper end of an upright bracket 37, the lower end of which is secured to the head 7 of the conventional front wheel spindles 8 and 9 by suitable cap screws or bolts 38, shown in Figure 5. Thus, the head 7 may readily be rotated in either direction by manipulation of the steering wheel 12 of the tractor, thereby to guide the tractor in its traveling movements.

Each tie rod 35 comprises 2 sections which are telescopically connected together to permit longitudinal adjustment of the tie rods, necessary when varying the spacing between the front wheels 13 of the tractor, as will be understood by reference to Figure 2. Suitable means, indicated at 39 in Figure 3, is provided for locking the tie rod members in adjusted positions.

In Figures 11 and 12 there is shown a construction wherein a pair of radius rods 41 are utilized for reinforcing the front axle 22 against rearward thrusts, when the tractor is moved forwardly in soft or loose soil. The forward ends of the radius rods 41 are shown secured to a pair of brackets 42 suitably fixed to the front axle member 22. Bolts 43 secure the forward ends of the radius rods to the brackets 42, and the rear end portions of the radius rods are supported by a bracket, generally designated by numeral 44. The bracket 44 is shown provided with laterally extending upwardly turned end portions 45 which are secured to the depending portions or flanges of the spaced arms 15—15 of the mounting bracket 14, by such means as bolts 46.

The rear end portions of the radius rods are pivotally connected to the depending portion 47 of the bracket 44 to allow for pivotal movement of the front axle 22 about the pivot pin 23. To thus pivotally mount the rear end portions of the radius rods in the depending portion 47 of the bracket 44, the rear portions thereof are shown supported in a swivel block 48 which, in turn, is pivotally mounted in the bracket 47 by pivot pins 49, disposed in axial alignment with the pivot pin 23 of the front axle member 22, whereby the front axle, including the radius rods, may freely oscillate about the pivot pin 23 when driving over uneven ground surfaces. The depending portion 47 of the bracket 44 is forked to receive the swivel block 48.

Another important feature of the invention resides in the provision of a front axle mounting of this general type which readily lends itself for use as a front wheel assembly for a four-wheel trailer.

To thus utilize the axle mounting for supporting the front wheels of a trailer, the rearwardly extending arms 15—15 of the mounting bracket 14 are secured to the bottom of the front end portion of a trailer body 50, indicated in dotted and full lines on Figures 8 and 9, respectively, by bolts 18. A depending stud 51 is secured to the central portion of the axle member 22, and has one end of a draft member or arm 52 pivotally connected thereto, as best illustrated in Figure 9. The arm 52 may be pivotally retained on the stud by such means as a washer 54 and cutter pin 55. Laterally spaced studs 56 have their lower ends secured in the arm 52 and have the adjacent ends of a pair of tie rods 57 pivotally connected thereto. The opposite ends of the tie rods are pivoted to a pair of forwardly extending arms 58 having their rear ends detachably secured to the rearwardly extending spindle arms 34 of the spindle bolts 32 by such means as bolts 59. See Figures 8 and 10.

A draft tongue 61 has its rear end pivotally connected to the forward end of the arm 52 by a pivot bolt 62. The draft tongue 61, which is preferably of channel cross-section, as shown in Figure 9, has its rear end forked as indicated at 63 in Figure 8 to provide a rugged pivotal connection between the arm 52 and draft tongue 61. The forward end of the draft tongue 61 is provided with a suitable aperture 64 whereby it may readily be coupled to the usual draft bar or trailer hitch of a power vehicle, as will be understood.

Each tie rod 57 comprises two sections which are telescopically secured together for longitudinal adjustment in a manner similar to the tie rods 35 shown in Figure 3, and whereby their lengths may readily be varied in accordance with the lateral spacing of the front wheels 13.

The novel front wheel mounting herein disclosed may readily and quickly be adjusted to adapt the tractor for cultivating various crops wherein the spacing between adjacent plant rows may vary considerably. Its construction is such that the operator may readily make such adjustments in the field, when necessary, as such adjustments may be made without the use of special tools or equipment. The front axle member is extremely sturdy and rugged because of its unique construction, whereby the axle is not likely to become distorted when subjected to heavy loads or shocks. Also, by widely spacing apart the front wheels of the tractor, as indicated at C—C in Figure 2, the danger of the tractor turning over, when traveling over rough or uneven terrain is greatly minimized.

It is well known in farming communities that conventional narrow gauge tractors, of which there are now a great many in use, are often very difficult to accurately guide between plant rows, particularly if the ground is soft, because of the front wheels tending to weave more or less from side to side, as the tractor advances between the crop rows. This difficulty may be completely overcome when the front wheels are widely spaced apart, as indicated at B and C in Figure 2. The mounting bracket 14 is so designed and configurated that it may readily be secured to the under sides of the front ends of most conventional tractor frames having narrow gauge front wheels, without requiring the removal of the usual front wheel pedestal 3, as will readily be understood by reference to Figures 1, 3, and 5. This is made possible because of the forked design of the mounting bracket 14, whereby its rearwardly extending arms 15—15 readily clear the pedestal 4, as indicated in full and dotted lines in Figures 3 and 8 respectively.

When the front wheel pedestal 4 is thus left in its normal position on the tractor, the operation of operatively connecting the widely spaced front wheels of the tractor to the steering wheel 12 of the tractor is greatly simplified, as will readily be understood by reference to Figures 1, 3 and 5, wherein it will be noted that the bracket 37 operatively connects the tie rods 35 of the tractor front wheels to the upright steering shaft 6 provided within the pedestal 4.

Another advantage gained by leaving the front wheel pedestal 3 in its normal position upon the tractor resides in the fact that should it become desirable to restore the tractor to its normal narrow gauge front wheel structure, as indicated by the dotted line positions A in Figure 2, such reconversion may readily and quickly be accomplished by simply removing the mounting bracket 14 from the tractor and replacing the front wheels on the original spindles 8 and 9, it being understood that the tie rods 35 and the upright bracket 37 are also detached, as these parts have no function when the front wheels are restored to their original narrow gauge positions. The unique construction of the front axle 22 is important in that it provides a very substantial and rugged axle structure which is not likely to deflect or become distorted under the weight of the load imposed thereon. Such rugged axle construction also assures proper alignment of the front wheels under all operating conditions. The main body of the front axle, as herein before disclosed, is composed of the upper H-shaped section and the lower semi-cylindrical member, which have their adjacent edges suitably secured together whereby said members, when thus united, cooperate to comprise a front axle structure having adequate strength to meet all operating conditions.

The foregoing detailed description has been given for clearness of understanding only, and no unnecessary limitations should be understood therefrom, but the appended claims should be construed as broadly as permissible in view of the prior art.

I claim as my invention:

1. An elongated tubular axle structure composed of an elongated member of H-shaped cross-section comprising spaced parallel upright flanges and a horizontal connecting web, and a semi-cylindrical member comprising spaced parallel upwardly directed edges, the edges of said semi-cylindrical member abuttingly engaging the bottom edges of the upright flanges of said H-shaped member, and being fixedly secured thereto to provide a composite tubular axle structure having a longitudinal bore in each end thereof.

2. A tubular axle structure according to claim 1, wherein the bores in the opposite ends of said axle structure are non-circular in cross-section, stub shafts of similar cross-section slidably received in said bores, each of said shafts having means at its outer end for pivotally supporting a ground-engaging wheel, and means for locking said shafts in fixed adjusted positions in said axle structure.

3. An axle structure according to claim 2, wherein each stub shaft has an upright spindle bearing at its outer end, front wheel spindles rotatably supported in said bearings and each having a front wheel mounted thereon, and means for imparting pivotal movement to said spindles.

4. A wide front axle mounting for converting a narrow gauge front wheel tractor into a wide front tractor wherein the front wheels are widely spaced apart, said mounting comprising a main bracket having means for fixedly securing it to a tractor frame, said bracket having its central portion provided with downwardly directed spaced wall portions adapted to receive therebetween a tubular axle member, a pivot pin for pivotally connecting the axle member to said spaced wall portions, stub shafts mounted in the ends of the tubular axle member and each having a spindle at its lower end, front wheels mounted on said spindles, a pair of radius rods having their forward ends pivotally connected to the front axle member, means for pivotally connecting the rear ends of said radius rods to the tractor frame, and said main bracket having a rearwardly extending portion to which the rear ends of the radius rods are connected, and whereby the radius rods may be assembled in the axle mounting independently of the tractor frame.

References Cited in the file of this patent

UNITED STATES PATENTS

| Number | Name | Date |
|---|---|---|
| 647,801 | Bruner | Apr. 17, 1900 |
| 897,143 | Preston | Aug. 25, 1908 |
| 1,792,035 | Roggeman | Feb. 10, 1931 |
| 1,826,238 | Buse | Oct. 6, 1931 |
| 1,868,474 | Streklow | July 19, 1932 |
| 2,074,685 | Engstrom | Mar. 23, 1937 |
| 2,175,965 | Madden | Oct. 10, 1939 |
| 2,178,505 | Warneke | Oct. 31, 1939 |
| 2,264,924 | Wolrab | Dec. 2, 1941 |
| 2,507,369 | Clapper | May 9, 1950 |
| 2,561,114 | Hardin | July 17, 1951 |
| 2,631,863 | Tranter et al. | Mar. 17, 1953 |